Nov. 9, 1965 — H. BIEHL — 3,216,615
APPARATUS FOR HANDLING ENSILAGE MATERIALS
Filed Feb. 28, 1963
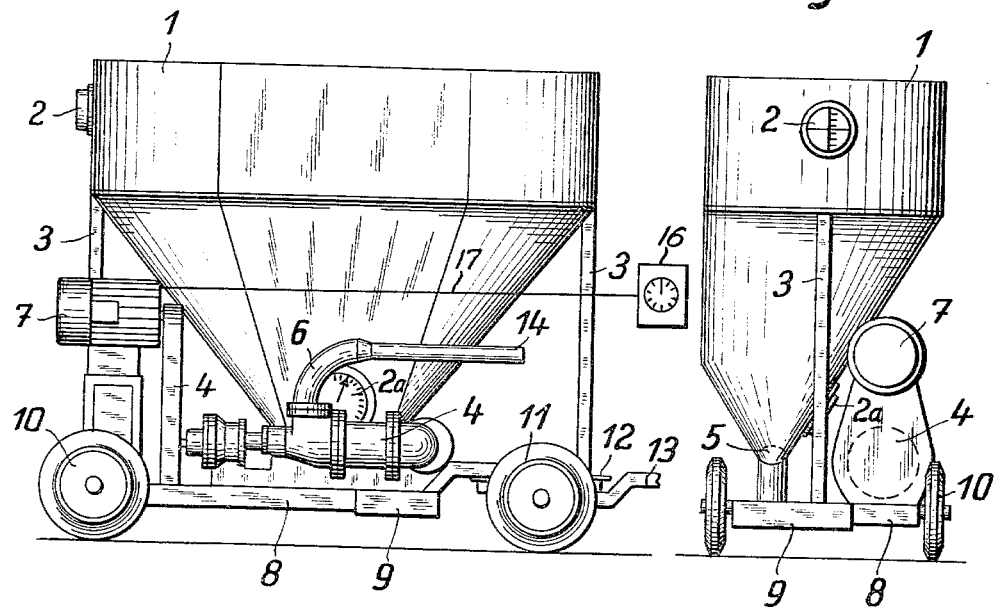
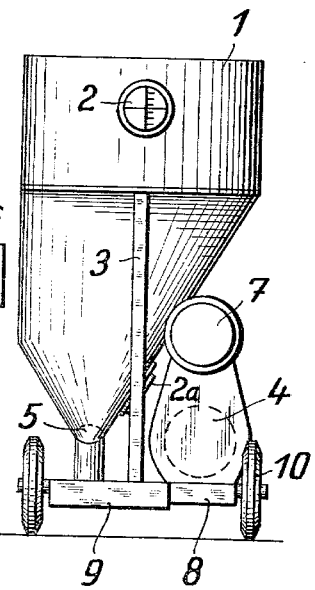
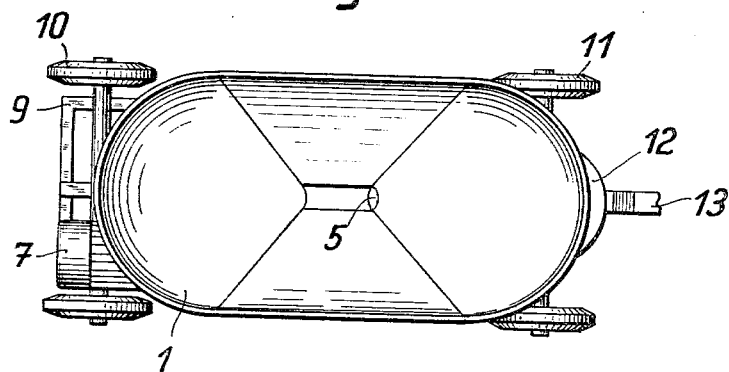
INVENTOR:
Heinrich Biehl
BY: Beaman & Beaman

United States Patent Office 3,216,615
Patented Nov. 9, 1965

3,216,615
APPARATUS FOR HANDLING ENSILAGE MATERIALS
Heinrich Biehl, Heinrichshof, near Trittau, Germany
Filed Feb. 28, 1963, Ser. No. 261,586
Claims priority, application Germany, Mar. 1, 1962,
B 66,150
1 Claim. (Cl. 222—25)

The invention relates to preserving forage crops and particularly to an improved method of preparing and handling ensilage materials by means of a forage wagon which is installed in order to transmit fodder from the storage bin to the crib. The invention relates more particularly to a forage wagon which is provided with means for automatically regulating the fodder dosage.

It is an object of the invention to provide a new and improved method of handling preserved fodder material which is stored in a silo wherein it has been ensilaged, by filling up the ensilage from said silo into a storage container mounted on a forage wagon, carrying said ensilage within said forage wagon to the feeding-ground and there discharging said ensilage out of said storage container.

It is a further object to provide a new and useful method of handling ensilage material being stored in a silo by pumping the ensilage from said silo into a storage container mounted on a forage wagon carrying said ensilage within said forage wagon to the feeding-ground and there discharging said ensilage out of said storage container by means of a pump and pumping it into feeding bins at said feeding-ground.

It is a further object of the invention to provide an improved method of preparing and handling ensilaged materials consisting of a mixture of fresh fodder and dry substances which have been individually comminuted and then have been pumped into separate storage containers each, and have been delivered from said storage containers into a mixing device wherein a homogeneous mixture has been prepared, said mixture having been ensilaged in a silo, the improved method being characterized in that the ensilage is pumped from said silo into a storage container mounted on a forage wagon, said storage container being provided with a self-acting gauging and indicating device for automatically limiting the load, in that said ensilage is carried within said forage wagon to the feeding-ground and there is discharged out of said storage container by means of a pump. The indicating device may be in the form of an alarm-type recording means.

It is another object to provide a new method for handling ensilage material which is stored in a silo by pumping the ensilage from said silo into a storage container placed on a forage wagon, said pumping being controlled by a dial gauge mounted on the container in order to check the quantity delivered to the container, said ensilage being carried within said forage wagon to the feeding-ground and there being discharged by means of a wagon mounted pump into feeding containers and a gauging and indicating device measuring the ensilage being delivered.

It is a further object of the invention to provide an apparatus for handling ensilage, said apparatus being characterized by a forage wagon consisting of a silo type container supported on a chassis, a suction pipe terminating at the deepest point in said container, and a delivery pump connected to said suction pipe, said pump being driven via an electric motor, said pump having connected thereto a fodder discharge hose via a pressure pipe and a hose connection.

According to a further object of the invention said electric motor is provided with a timing switch capable of being preadjusted for metering the desired amount of delivery.

Yet another object of the invention is an apparatus for handling ensilage characterized by a forage wagon consisting of a silo type container supported on a chassis, a suction pipe terminating at the bottom of said container, and a delivery pump connected to said suction pipe, said container being provided with an automatic filling level measuring and indicating device, said pump being operated by an electric motor, said motor being provided with a timing switch controlling the quantity delivered, said pump having connected thereto a fodder discharging hose via a pressure pipe and a hose connection.

Other and further objects will appear from the following description in which:

FIG. 1 shows an elevational side view of a fodder-wagon for fodder capable of being pumped.

FIG. 2 a plan view on the fodder wagon,

FIG. 3 shows an end view of the fodder wagon.

The fodder tank 1 which is designed in the manner of a open top silo rests on the chassis and is supported by trestles 3. The chassis consists of a frame 9 with a base plate 8 resting thereon. The frame has a rear axle attached thereto in a manner known per se. The front axle 11 is attached to a turntable 12 provided with a center pole 13. In addition to the fodder container, the chassis carries delivery pump 4 which is driven by an electric motor 7 likewise arranged on the chassis. The pump 4 may be that special type of pump for viscous silaged fodder which has been described in more detail in patent application Serial No. 232,818. This pump serves only to withdraw ensilaged fodder from the container 1. The container is filled in accordance with this process from a stationary silo with the aid of a stationary pump installed at the silo. The delivery pump 4 sucks the fodder off via a suction pipe 5 the free end of which terminates at the deepest point of the mobile fodder container near the bottom of said container. The fodder is then pumped by means of the pump 4 via a pressure pipe 6 and a hose connection 14 into a hose and through said hose into the mangers.

The fodder container is equipped with a known per se filling amount metering and indicating device 2 indicating the amount of fodder in the container. The indicating device 2 may at the same time be designed as a signalling device for the filling operation to indicate when the container is full. A meter 2a meters and indicates the amount of fodder delivered by pump 4 to the mangers.

The electric motor 7 is intended to be switched on and off via a time switch 16 capable of being preadjusted. The preadjusting device of this switch may, for instance, be mounted in the tractor and is connected with the electric motor of the fodder wagon via a cable 17. The switch 16 may be of the type shown in United States Patent 3,018,922, for instance.

When carrying out the process of the present invention, there is no need for pumping the preserved fodder from the silo to the feeding places through piping system. Accordingly, the known stationarily installed pipe line system which for any change in the location of the feeding places will simultaneously entail a change in the location of the pipeline system, is avoided. In addition, the overall costs involved with running the known type of plant which are rather high, are lowered and while such a known plant might turn out to be too expensive for smaller farms, according to the invention a common plant for several smaller medium size farms is available. When this is carried into practice, it is practically no longer possible to charge the feeding places via a pipeline system.

It is therefore proposed in accordance with the invention to pump the fodder destined to be taken from the silo for consumption into the storage tank of a fodder wagon and pump it again out of said tank at the feeding places by means of a pump mounted on the wagon. The storage container of the fodder wagon in accordance with the invention is to have an automatic filling level metering and indicating device. Said indicating device may be equipped in a manner known per se such that the indicating device serves at the same time as a signalling device which gives a signal when a certain filling amount is not reached. In accordance with another feature of the invention, to meter the amount of delivery, an electric motor driving the delivery pump is to be switched via a timer adapted to be preadjusted. In this connection, the time switch is under certain circumstances to be adjusted to certain amounts of delivery.

When using this device to carry out the process, it will be possible to convey the finished fodder to places which are far away from the silo with a minimum of labour. In this operation, the discharge of the fodder may be metered, for instance, by the driver of the tractor moving the silo wagon via the above mentioned timer so as to provide many feeding places with the desired amounts of fodder without any additional assistance and in a relatively short period of time. It has been experienced that it is possible to automatically feed in this manner 500 animals in a few minutes.

What I claim is:

An apparatus for transporting and dispensing pumpable ensilage comprising, in combination, a chassis, ground wheels rotatably mounted upon said chassis adapted to support said chassis, a storage container having upper and lower portions mounted on said chassis, an inlet defined in said container upper portion, tapered converging wall portions defining said container lower portion, an outlet defined at the lowermost portion of said container, ensilage quantity sensing means mounted on said container sensing and indicating the quantity of ensilage therein, a pump mounted on said chassis, said pump having an inlet communicating with said container outlet and an outlet, motor means mounted on said chassis drivingly connected to said pump, discharge sensing means mounted on said container sensing and indicating the amount of ensilage pumped by said pump, a hose connection communicating with said pump outlet, and a timing switch controlling operation of said motor adapted to regulate the amount of ensilage pumped from said container by said pump.

References Cited by the Examiner

UNITED STATES PATENTS

| | | | |
|---|---|---|---|
| 1,929,231 | 10/33 | Yirava | 222—39 X |
| 1,954,024 | 4/34 | Pfening et al. | 222—39 X |
| 2,017,345 | 10/35 | Granberg. | |
| 2,059,965 | 11/36 | Joncha | 222—176 X |
| 2,366,925 | 1/45 | May | 222—14 |
| 2,437,618 | 3/48 | Schottgen et al. | 222—23 |
| 2,500,943 | 3/50 | Radke | 222—405 X |
| 2,517,300 | 8/50 | Giese | 222—405 X |
| 2,578,863 | 12/51 | Trelease | 222—176 X |
| 2,651,438 | 9/53 | Peterson. | |
| 2,661,869 | 12/53 | Simpson | 222—176 X |
| 2,816,692 | 12/57 | Schade | 222—155 X |
| 2,819,821 | 1/58 | Morse | 222—178 X |
| 3,018,922 | 1/62 | Williamson | 222—25 |

RAPHAEL M. LUPO, *Primary Examiner.*